United States Patent [19]

Ishimitsu

[11] 4,205,810
[45] Jun. 3, 1980

[54] MINIMUM DRAG WING CONFIGURATION FOR AIRCRAFT OPERATING AT TRANSONIC SPEEDS

[75] Inventor: Kichio K. Ishimitsu, Mercer Island, Wash.

[73] Assignee: The Boeing Company, Seattle, Wash.

[21] Appl. No.: 862,287

[22] Filed: Dec. 19, 1977

[51] Int. Cl.² .............................................. B64C 5/08
[52] U.S. Cl. ...................................... 244/91; 244/199
[58] Field of Search .................... 244/198, 199, 91, 15; D12/71, 81

[56] References Cited

U.S. PATENT DOCUMENTS

| | | | |
|---|---|---|---|
| 2,576,981 | 12/1951 | Vogt | 244/91 |
| 3,845,918 | 11/1974 | White, Jr. | 244/91 |
| 4,050,397 | 9/1977 | Vanderleest | 244/91 |

OTHER PUBLICATIONS

"Concepts for Aircraft Drag Reduction," Hefer et al., 3/28-4/1/77.
Whitcomb et al. "High Subsonic Speed W-T Invest. of Winglets . . . " Jul. 1976.

*Primary Examiner*—Galen L. Barefoot
*Attorney, Agent, or Firm*—Christensen, O'Connor, Johnson & Kindness

[57] ABSTRACT

A tip fin or wing extension is disclosed wherein the tip fin is mountable to a conventional aircraft wing to form a nonplanar wing configuration which minimizes induced drag during both low speed and high speed operation of the aircraft. The tip fin is of generally trapezoidal geometry extending streamwise along the end of the aircraft wing and projecting vertically upward therefrom. The height of the tip fin and its cross sectional geometry are established to provide a substantial reduction in induced drag relative to that exhibited by the aircraft wing alone. Further, the tip fin is joined to the wing by a smoothly contoured upwardly extending arcuate region and the maximum thickness ratio of the tip fin airfoil section is established to minimize interference drag caused by the interaction of the tip fin within the wing flow field. In addition, the tip fin is twisted such that the angle of incidence between the tip fin chordal plane and the free-stream direction varies as a function of position along the tip fin height. This twist distribution is established to provide near optimal loading of the wing.

12 Claims, 8 Drawing Figures

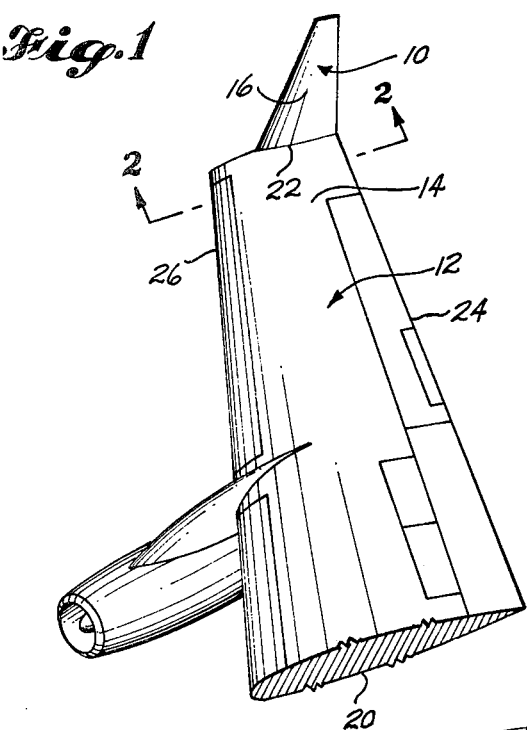
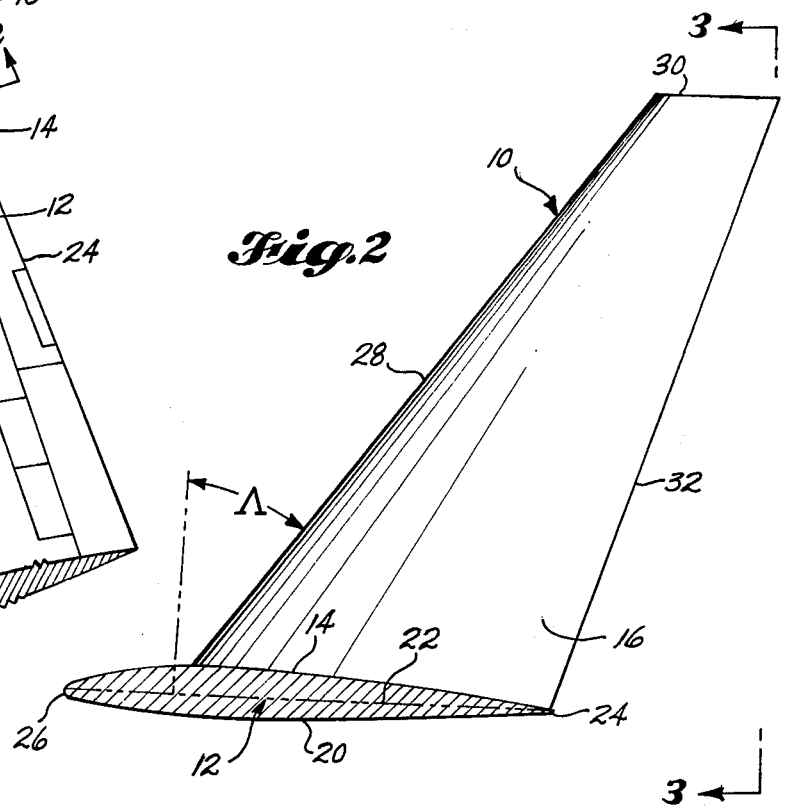
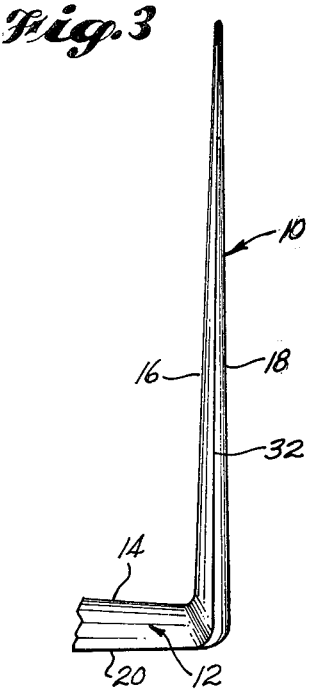
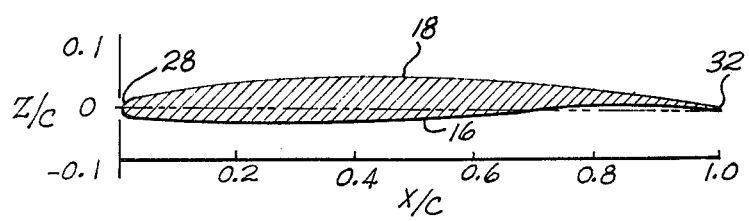
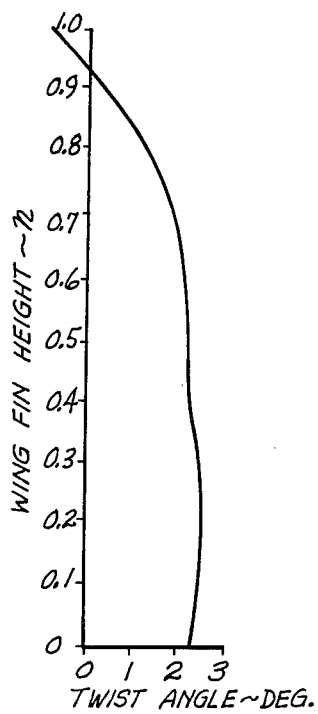

MINIMUM DRAG WING CONFIGURATION FOR AIRCRAFT OPERATING AT TRANSONIC SPEEDS

BACKGROUND OF THE INVENTION

This invention relates to high efficient aerodynamic lifting surfaces. More particularly, this invention relates to airfoils such as wings and control surfaces which are configured to reduce or minimize induced drag.

It has long been recognized in the art that the aerodynamic efficiency of a lift-producing airfoil such as an aircraft wing is affected not only by the profile drag of the airfoil, but by a drag component commonly called induced drag. This induced drag results from pressure on the upper and lower surfaces of the wing and, from the airflow direction caused by the lift producing wing-like structure. With respect to induced drag, this airflow is most significant at and near the ends or tips of the wings since the pressure differential produces airflow that is transverse to the stream of lift-producing air. Since induced drag is most significant at the wing tips, it has been recognized in the art that, considering a wing having an area S, the aerodynamic efficiency can be increased by increasing the span of the wing, i.e., maximizing the wing aspect ratio $b^2/S$, where b is the wing span.

Simply increasing the wing span to decrease the effect of induced drag and thereby increase aerodynamic efficiency is subject to structural constraints which limit the efficiency increases that can be attained. For example, to achieve structural integrity of the aircraft, the thickness of the wing must be increased as the wing is made longer. Such an increase in thickness increases the weight of the wing. Not only does the increase in profile which results form increasing wing aspect ratio drag detract from efficiency gains effected by a higher wing aspect ratio, but a point is eventually reached where the increase in profile drag totally offsets the benefits attained by a higher aspect ratio. Further, the attendant increase in wing weight often means that the wing must be operated at a higher coefficient of lift $C_L$ in order to provide the desired aircraft performance. Since the induced drag term is not only an inverse function of the wing aspect ratio, but is also directly proportional to $C_L^2$, it can again be seen that high aerodynamic efficiency cannot be attained simply by increasing wing aspect ratio.

Because of the limitations associated with planar wings of increased aspect ratio, various other means of decreasing induced drag have been proposed. For example, in U.S. Pat. No. 1,724,110, which issued to E. G. Reid, on Aug. 13, 1929, relatively thin fins or shields that extend streamwise along the wings and project outwardly from the wing surfaces to prevent or impede transverse flow along the wing surfaces are utilized. In this respect, endplates that project orthogonally above and below the wing tips are disclosed along with similarly constructed shields or plates that can be utilized at various locations along the wingspan.

Additionally, in U.S. Pat. No. 3,270,988, which issued to C. D. Cone, Jr., on Sept. 6, 1966, various other nonplanar wing designs are described which increase the effective aspect ratio of the wing to thereby attain higher aerodynamic efficiency. More specifically, although the disclosure of the Cone patent is primarily addressed to apparatus and methods for analyzing nonplanar wing configurations with respect to ascertaining the effective aspect ratio and thereby determine the aerodynamic efficiency of the configuration, various nonplanar wing geometries are suggested within this patent. Among these wing configurations are tubular sections of circular and elliptical cross-sectional geometry which are mounted at the tips of the planar wing with the axis of such tubular sections being substantially parallel to the flow direction of the free stream air and, a nonplanar wing which is divided at the tip into a number of branches that extend arcuately upward such that the wing terminus is effectively a number of "winglets" of different curvature which radiate from a planar wing.

Although endplates and other structures that have been previously proposed are generally satisfactory with respect to low speed aircraft, various disadvantages and drawbacks have prevented such apparatus from being incorporated in the design of modern high-speed aircraft. First, since modern high-speed aircraft are generally designed to operate a relatively high coefficients of lift, the profile drag associated with endplates or other nonplanar wing geometries is of even greater importance that it is with respect to low speed aircraft. Further, since such endplates are located in and influence the flow field of the wing, interference drag is created which at least partially cancels the benefits achieved by decreasing induced drag. Such interference drag often increases and becomes more of a problem in high speed aircraft since flow separation can easily occur at the boundary or transition between the wing and endplate structure. Additionally, since such high speed aircraft generally cruise at transonic flight velocities, shock waves can be induced by such boundary ior transition regions wich result in compressibility drag that can completely offset any increase in aerodynamic efficiency that is effected under low speed conditions. Even further, and expecially with respect to nonplanar configurations in which the structure for reducing induced drag also provides lift, the spanwise pressure distribution along the wing can be affected to greatly increased wing bending moments. For example, not only does the weight increase that is often brought about by the use of endplates increase the wing bending moment, but if the section of the wing which reduces induced drag also produces lift, such as the branched winglet arrangement in the patent to Cone, further increases in bending moments occur.

Because of the above-mentioned drawbacks and others, there has been relatively little interest in applying endplates (or, as they have come to be called, tip fins or winglets) to modern high speed aircraft until the potential exhaustion of petroleum resources became apparent and, as a consequence, the cost of aircraft fuel increased. Recognizing that an increase in aircraft operating efficiency not only conserves energy resources, but is important in providing aircraft that can be operated economically, those skilled in the art have thus begun to consider the design of more efficient aircraft engine and aircraft structure.

In this respect, it should be noted that both the military and commercial operators of high speed aircraft presently possess a substantial number of such aircraft and a large number are also currently in production. Thus, not only are designs necessary and desirable for a new generation of highly efficient aircraft, but designs are required for retrofitting to existing aircraft and for incorporation in aircraft currently being produced without requiring major design changes.

Accordingly, it is an object of this invention to provide a nonplanar wing configuration which exhibits high aerodynamic efficiency on both low speed and high speed flight of the aircraft.

It is another object of this invention to provide a wing configuration wherein induced drag is reduced relative to a conventional wing of the same aspect ratio and wherein a wing tip fin produces minimal profile drag and causes minimal interference and compressibility drag.

It is yet another object of this invention to provide a wing tip fin for reducing induced drag wherein a tip fin is also configurated for causing minimal increase in wing bending moment normally attendant to adding structure to the outboard portions of the wing.

Even further, it is an object of this invention to provide a wing tip fin of the above-described type which is readily incorporated in present aircraft designs and readily retrofittable to existing high speed aircraft.

SUMMARY OF THE INVENTION

These and other objects are achieved in accordance with this invention by a tip fin that is joined to the end of an aircraft wing to extend streamwise along the upper surface of the wing and project vertically upward therefrom. In accordance with this invention, the tip is effectively an airfoil of constant maximum thickness ratio which is twisted relative to the direction of the freestream air. In this respect, the base or root of the tip fin is effectively toed-in such that the tip fin leading edge is nearer to the centerline of the aircraft fuselage than is the tip fin trailing edge. To provide a spanwise load distribution over the wing which minimizes induced drag, the twist varies along the height dimension of the tip fin. In the disclosed embodiment, this variation is rather gradual throughout the majority of the tip fin height and varies rather rapidly through the upper portion of the tip fin such that the upper terminus of the tip fin is toed-out (leading edge directed outwardly relative to the free stream direction).

Viewed from the side, the tip fin of this invention is generally trapezoidal in geometry with the root chord of the tip fin extending from the trailing edge of the aircraft wing to a position that is located aft of the wing leading edge. The leading edge of the tip fin is inclined or swept relative to the vertical direction and the tip fin has a taper ratio (i.e., ratio between the chord length at the upper terminus of the tip fin and the chord length at the tip fin root), which maintains the sectional lift coefficients within the upper region of the tip fin below those which cause flow separation during high speed flight. In addition, and within the previously mentioned constraints, the tip fin leading edge sweep, tip fin area, and position at which the tip fin leading edge intercepts the tip chord of the tip fin are controlled to minimize tip fin profile drag and interference drag caused by the tip fin being located in the wing flow field.

BRIEF DESCRIPTION OF THE DRAWINGS

Other objects and advantages of this invention will be apparent to one skilled in the art after a reading of the following description relative to the accompanying drawing in which:

FIG. 1 is an isometric view of the outboard section of an aircraft wing which incorporates a tip fin constructed in accordance with this invention;

FIG. 2 is a side view of the combined wing and tip fin arrangement of FIG. 1;

FIG. 3 is a rear view of the combined wing and tip fin of this invention;

FIG. 4 depicts the streamwise airfoil section of the tip fin of this invention;

FIG. 5 graphically depicts the twist distribution of one embodiment of this invention relative to the height of the tip fin; and, FIGS. 6, 7 and 8 graphically depict design constraints appropriate to embodying the present invention within high speed aircraft.

DETAILED DESCRIPTION

Figure 6:
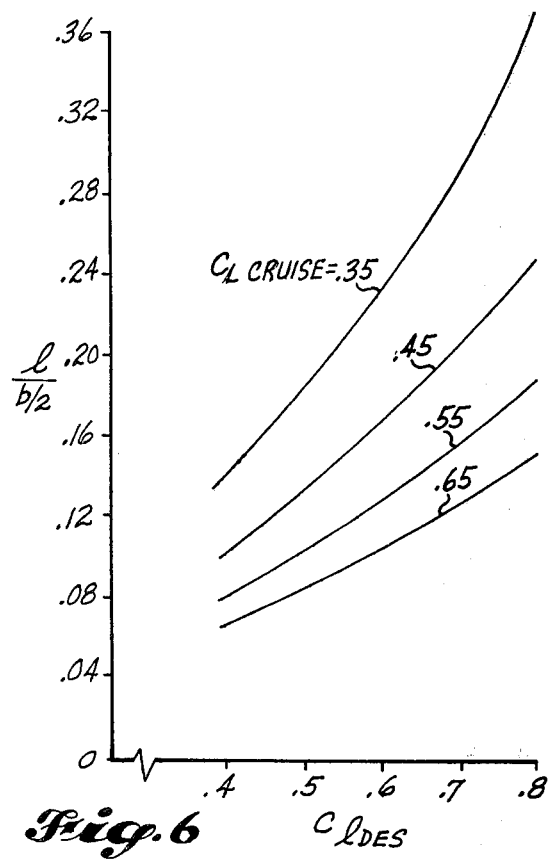

Referring to FIGS. 1, 2 and 3, the tip fin of this invention (generally denoted by the numeral 10) is an airfoil that is mounted to, or integrally formed with, an aircraft wing 12 to form a nonplanar wing configuration which reduces induced drag below that exhibited by the wing 12 alone. As shall be described in more detail hereinafter, the tip fin 10 and the manner in which it is joined to the wing 12 are dimensioned and arranged for minimal interference and compressibility drag during both low speed and high speed operation of the aircraft to thereby provide high aerodynamic efficiency.

As can best be seen in FIGS. 1 and 3, the tip fin 10 is joined to the end of the wing 12 and projects vertically upward therefrom. The base or root of the tip fin 10 is contoured along the juncture with the wing 12 to form an aerodynamically smooth transition between the upper surface 14 of the wing 12 and the inboard boundary surface 16 of the tip fin 10, which transition region can be of substantially constant radius. In a similar manner, the lower region of the outboard boundary surface 18 of the tip fin is contoured to arcuately intersect with and blend into the lower surface 20 of the wing 12.

Viewed from the side (FIG. 2), the tip fin 10 is trapezoidal in geometry with the root chord 22 of the tip fin 10 extending from the wing trailing edge 24 to a point aft of the wing leading edge 26. The tip fin leading edge 28 extends upwardly and is inclined or swept relative to the vertical by a sweep angle $\Lambda$, with the tip fin tip chord 30 being substantially horizontal and being dimensioned such that the tip fin 10 has a taper ratio (ratio between length of the tip chord 30 and the base chord 22) which is generally between 0.25 and 0.35. The tipe fin trailing edge 32 extends downwardly from the aft terminus of the tip chord 30 to the wing trailing edge 24 at an angle which is generally less than that of the tip fin leading edge sweep angle $\Lambda$.

As can be seen in FIG. 3 the tip fin 10 gradually decreases in thickness between the root chord 22 and tip chord 30 with the upper terminating edge of the tip fin 10 being rounded or of other aerodynamically smooth contour. Although the thickness of the tip fin 10 gradually decreases along the height dimension, the tip fin 10 is of a constant airfoil geometry throughout its entire length. That is, the maximum thickness ratio $t/c$, where $t$ is the thickness dimension of the tip fin 10 and $c$ is the chord length at any particular point along the height of the tip fin 10, remains constant throughout the heighth dimension. This aspect of the invention is depicted in FIG. 4, wherein the sectional airfoil geometry of the tip fin 10 is illustrated with the thickness dimension $Z$ and chordwise dimension $X$ normalized with respect to chord length $C$.

As is illustrated in FIG. 4, the tip fin airfoil section is cambered such that the distance between the tip fin outboard boundary surface 18 and the tip fin chord is greater than the distance between the tip fin inboard boundary surface 16 and the tip fin chord for X/C less than approximately 0.75. Further, the tip fin inboard boundary surface 16 intersects the tip fin chord at X/C approximately equal to 0.75 and smoothly converges with the outboard boundary surface 18 to form a cusped region which terminates in the trailing edge 32.

Although the maximum thickness ratio of the tip fin 10 remains constant between the tip fin root chord 22 and the tip fin tip chord 30, the tip fin chordal plane is not coincident with a vertical plane that is substantially perpendicular to the aircraft wing 12. More specifically, tip fin 10 exhibits twist such that the angle of incidence between the tip fin 10 and the freestream air varies along the tip fin height. This twist variation is depicted in FIG. 5, which illustrates tip fin twist angle relative to a normalized height parameter $\eta$ where $\eta$ is equal to the distance between the tip fin root chord 22 and a particular location along the tip fin height divided by the total tip fin height l. With reference to FIG. 5, it can be seen that the depicted embodiment of the invention has a twist angle of approximately 2.25° (the tip fin leading edge 28 positioned inboard of the trailing edge 32 relative to the freestream direction) at the base or root of the tip fin 10. Relative to vertical distance along the tip fin 10, the twist angle gradually increases to a value of approximately 2.5 at a position of $\eta$ approximately equal to 0.2; slowly decreases to a value of approximately 2.25 at a position of $\eta$ approximately equal to 0.4; continues to decrease slowly to a value of approximately 2.0 at a position of $\eta$ approximately to 0.7; decreases more rapidly to 0° at $\eta$ approximately equal to 0.92; and, linearly decreases to a value of approximately 1° at $\eta$ equal to 1.0.

With the above described basic structure of the tip fin 10 in mind, the relationship between the previously described various geometric and dimensional aspects of the invention can now be understood relative to the drag terms which affect the aerodynamic efficiency of the combined wing-tip fin configuration. In this respect, and as previously mentioned, the invention overcomes many prior art disabilities and drawbacks to provide a nonplanar wing configuration which is aerodynamically efficient under both low speed and high speed aircraft operating conditions. In particular, it has been discovered that maintaining the hereinafter described dimensional and geometric relationships not only minimizes induced drag, but also tends to minimize interference and compressibility drag terms which result from the flow interaction between the tip fin 10 and the wing 12. Further, these dimensional constraints and relationships configure the combined wing-tip fin such that wing bending moments are not substantially increased to thereby necessitate thicker wing structure which would be least partially offset potential gains in aerodynamic efficiency.

First, it has been discovered that, to provide maximum reduction in induced drag with the wing fin of this invention, the vertical height of the wing fin must be established as a function of the span of the wing 12 (i.e., the aircraft semispan b/2, where b is the total aircraft wingspan), the sectional design coefficient of lift ($C_{IDES}$), and the desired coefficient of lift to be attained at the aircraft cruise velocity ($C_{LCRUISE}$). More specifically, FIG. 6 graphically illustrates the necessary tip fin height relative to the aircraft semi-span (l/(b/2)) for $C_{IDES}$ ranging between 0.4 and 0.8 and for cruise coefficients of lift equal to 0.35, 0.4, 0.55 and 0.65. Viewing FIG. 6 and considering the typical lift coefficients at the cruise velocity of aircraft that operate in the transonic region, it can be seen that embodiments of this invention utilize a height dimension in the range 0.068 (b/2) and 0.25 (b/2), except for those few aircraft which have a relatively high $C_{IDES}$ and which operate at a relatively low $C_{LCRUISE}$.

Figure 8:
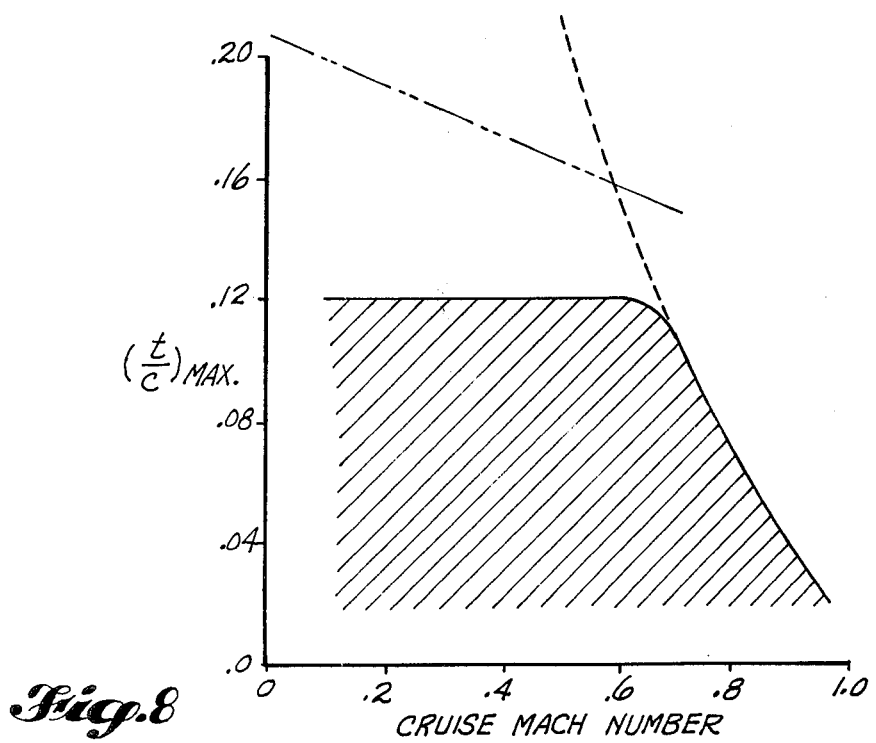

Several structural and dimensional relationships are important in minimizing interference drag and compressibility drag associated with shock waves that can form in the interface region between the wing fin 10 and the wing 12. First, as will be recognized by those skilled in the art, the transition between the tip fin 10 and the wing 12 must be aerodynamically smooth and structured such that shock waves are not generated under high speed flight conditions. In accordance with this invention, this criteria is met by the radius formed between the upper surface 14 of the wing 12 and the inboard boundary surface 16 of the tip fin 10 and by the smooth arcuate transition between the lower surface 20 of the wing 12 and the outboard surface 18 of the tip fin 10. Beyond this general consideration, it has been found that the cross sectional airfoil geometry of the tip fin 10 is of prime importance in minimizing interference and compressibility drag. In this respect, the cross sectional airfoil geometry depicted in FIG. 4 has been found entirely satisfactory if the maximum thickness ratio $(t/c)_{max}$ is maintained within a range that is a function of the cruise velocity of the aircraft employing the invention. This dimensional constraint is graphically set forth in FIG. 8 from which it can be ascertained that $(t/c)_{max}$ of the tip fin airfoil section should be between 0.02 and 0.12 for an aircraft cruising below approximately Mach 0.65 and should be between 0.02 and approximately $0.12 + 0.4(0.65 - M_C)$, where $M_C$ is the cruise velocity of the aircraft, for aircraft cruising above Mach 0.65 and below approximately Mach 1. The exact value of the $(t/c)_{max}$ utilized in a particular embodiment of the invention should be based on fabrication considerations in that tip fins of higher $(t/c)_{max}$ are simpler and more economical to fabricate. Further, the exact value of $(t/c)_{max}$ employed in a particular embodiment should also be based on structural considerations relevant to effecting the desired spanwise loading on the wing 12.

Although minimizing the profile drag of the tip fin of this invention generally requires constructing a tip fin with minimal surface area, several other considerations determine the optimal area. First, the tip fin taper ratio must be maintained above a value at which the sectional lift coefficients of the upper portion of the tip fin become large enough to cause flow separation under high speed flight conditions. In this respect, and as previously mentioned, it has been determined that tip fin taper ratios between 0.25 and 0.35 are generally satisfactory. Additionally, it has been found somewhat advantageous to dimension the tip fin such that the tip fin leading edge 28 intersects the tip chord of the wing 12 as far aft as possible since a slight improvement in interference drag is thereby attained.

Figure 7:
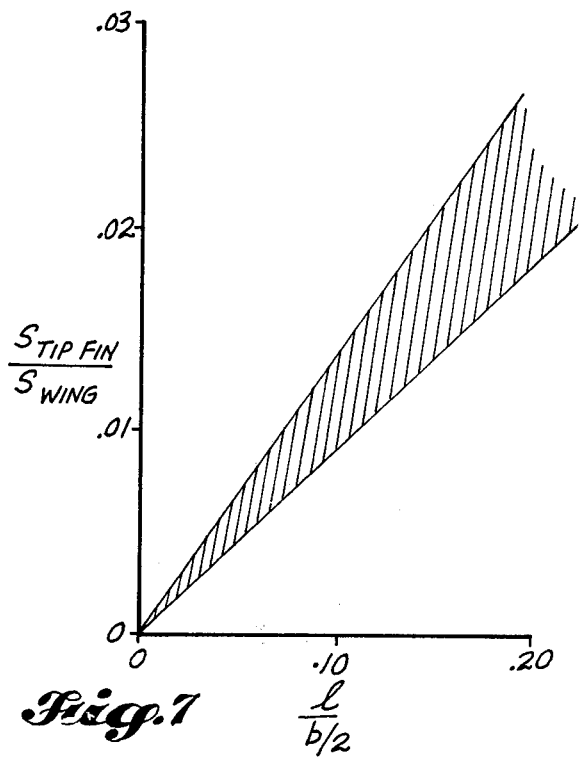

Considering all of the above factors and others which influence the geometry and area of a tip fin of this invention, it has been found that the ratio between the area S of the tip fin and the area of wing of the aircraft employing the invention should be related to the ratio between the tip fin height l and the semispan of the aircraft (b/2) in the manner depicted in FIG. 7. More specifically, and with reference to FIG. 7, the ratio of tip fin area to wing area should be within the range of 0.09 l/(b/2) to 0.138 l(b/2). The specific value of tip fin area utilized in each embodiment should be selected from this range of values in view of the previously mentioned secondary considerations in reducing interference and compressibility drag and to attain structural integrity of the tip fin.

In accordance with this invention, the twist angle distribution described relative to FIG. 5 is established so as to minimize the loading affect of the tip fin 10 on the wing 12. In this regard, although the twist distribution of FIG. 5 is suitable for a wide range of aircraft which cruise in the transonic region, it can be advantageous to experimentally vary the wing tip twist to attain as close to optimal spanwise loading of the wing 12 as is possible.

In view of the foregoing description of this invention, it can be recognized that this invention is well suited for incorporation in existing aircraft designs and for retrofitting to an aircraft presently in service. In particular, it can be recognized that, knowing the cruise coefficient of lift of the aircraft which is to employ the invention and the section design coefficient of lift ($C_{IDES}$), the necessary length of the tip fin can be obtained from FIG. 6. The remaining dimensional parameters can then be obtained in view of FIGS. 7 and 8 and as previously described herein.

In one retrofit application wherein the tip fin of this invention is embodied for use on an aircraft having a semispan of approximately 80 feet, a wing area of approximately 3230 square feet, a cruise velocity of approximately Mach 0.76, and a desired coefficient of lift at cruise of 0.55, the tip fin height is 0.135 (b/2) (approximately 130 inches) and $(t/c)_{max}$ was 0.066. In this embodiment, the area of the tip fin is approximately 1.5% of the wing area, the tip fin taper ratio is approximately 0.338 and the tip fin leading edge sweep angle is 37 degrees. In this embodiment, an overall reduction in drag of approximately 5.6% is obtained relative to the drag of an aircraft not equipped with the tip fin. Further, the increase is wing root bending moment is less than 1.9%, thereby permitting installation of the invention without substantial structural modification of the wing.

The embodiments of the invention in which an exclusive property or privilege is claimed are defined as follows:

1. A tip fin mountable to the outboard end of an aircraft wing to form a nonplanar wing configuration for reducing induced drag relative to that exhibited by the wing alone, said tip fin having first and second boundary surfaces contoured to define an airfoil section including a leading edge, a trailing edge, a root chord and a tip chord, said tip fin leading edge extending between said tip fin root chord and said tip fin tip chord at a first predetermined angle, said tip fin trailing edge extending between said tip fin root chord and said tip fin tip chord at a second predetermined angle, said tip fin tip chord having a length dimension less than that of said tip fin root chord, said tip fin extending vertically upward from said outboard end of said aircraft wing when said tip fin is mounted thereto with said tip fin root chord extending streamwise relative to said end of said wing with the intersection between said tip fin root chord and said tip fin leading edge being positioned inboard of the intersection of said tip fin root chord and said tip fin trailing edge, said tip fin leading edge intersecting the upper surface of said wing at a position aft of the leading edge of said wing and said tip being twisted over at least a portion of the distance between said tip fin root chord and said tip fin tip chord so that the intersection between said tip fin tip chord and said tip fin leading edge is positioned outboard of the intersection between said tip fin tip chord and said tip fin trailing edge.

2. The tip fin of claim 1 wherein the distance between said root chord and said tip chord is between approximately 0.068 (b/2) and approximately 0.25 (b/2), whereby b/2 is the semispan of said aircraft wing.

3. The tip fin of claim 2 wherein the maximum thickness ratio of said airfoil section defined by said first and second boundary surfaces of said tip fin is between approximately 0.02 and approximately $0.12 + 0.4(0.65 - M_C)$ and said tip fin is mounted to the wing of an aircraft having a typical cruise velocity greater than approximately Mach 0.65, where $M_C$ is the typical cruise velocity of the aircraft on which said tip fin is mounted.

4. The tip fin of claim 3 wherein the ratio of the surface area of said tip fin to the surface area of said aircraft wing is between 0.092 l/(b/2) and 0.138 l/(b/2), where l is the distance between said tip fin root chord and said tip fin tip chord and b/2 is the semispan of the wing to which the tip fin is mounted.

5. The tip fin of claim 4 wherein the ratio between said tip fin tip chord and said tip fin root chord is within the range of approximately 0.25 to approximately 0.35.

6. The tip fin of claim 2 wherein the maximum thickness ratio of said airfoil section defined by said first and second boundary surfaces of said tip fin is between approximately 0.02 and approximately 0.12 and the aircraft to which said tip fin is mounted typically cruises at a velocity less than approximately Mach 0.65.

7. A nonplanar wing configuration for minimizing induced drag comprising:
a conventional wing of substantially planar configuration having an upper surface and a lower surface, said upper and lower surfaces of said wing intersecting and joining one another to define a wing leading edge, a wing trailing edge and a wing tip; and,
a substantially trapezoidal tip fin mounted to said wing tip to extend vertically upward therefrom, said tip fin having a base boundary extending streamwise along said upper surface of said wing, said tip fin having a leading edge extending upwardly and rearwardly at a predetermined angle relative to the chordal plane of said wing with said tip fin leading edge intersecting said upper surface of said wing at a position aft of said wing leading edge, said tip fin having an aerodynamically contoured upper boundary extending rearwardly from the upper terminus of said tip fin leading edge and having a trailing edge extending downwardly from the aft terminus of said upper boundary to the trailing edge of said wing, said tip fin being contoured to have a substantially constant cross-sectional airfoil geometry relative to the streamwise direction throughout the distance between said tip fin base boundary and said tip fin upper boundary, said tip fin being twisted relative to the direction of free stream air to position said leading portion edge of said tip fin inwardly of said trailing edge of said tip along the lower portion of said tip fin, the angle formed between said tip fin leading edge and said freestream direction varying with respect to distance along said leading edge to position said leading edge of said tip fin outwardly of said trailing edge of said tip fin along the upper portion of said tip fin.

8. The nonplanar wing configuration of claim 7 wherein the distance between said tip fin base boundary and said tip fin upper boundary is between approximately 0.068 (b/2) and approximately 0.25 (b/2), where b/2 is the semispan of said aircraft wing.

9. The nonplanar wing configuration of claim 8 wherein the ratio of the surface area of said tip fin to the surface area of said conventional wing is between 0.092 l/(b/2) and 0.138 l/(b/2) where l is the distance between said tip fin base boundary and said tip fin upper boundary and b/2 is the semispan of said conventional wing.

10. The nonplanar wing configuration of claim 9 wherein the maximum thickness ratio of said cross-sectional airfoil geometry is between 0.02 and approximately $0.12 + 0.4(0.65 - M_C)$ and the aircraft utilizing said nonplanar wing configuration typically cruises at a velocity greater than approximately Mach 0.65, where $M_C$ is the typical cruise velocity of the aircraft employing said nonplanar wing configuration.

11. The nonplanar wing configuration of claim 10 wherein the ratio between said tip fin upper boundary and said tip fin lower boundary is within the range of approximately 0.25 to approximately 0.35.

12. The nonplanar wing configuration of claim 9 wherein the maximum thickness ratio of said cross-sectional airfoil geometry is between approximately 0.02 and approximately 0.12 and the aircraft using said nonplanar wing configuration typically cruises at a velocity less than approximately Mach 0.65.

* * * * *